Oct. 27, 1970    R. CAPGRAS    3,536,311
HYDROPNEUMATIC SUSPENSION
Filed March 27, 1968
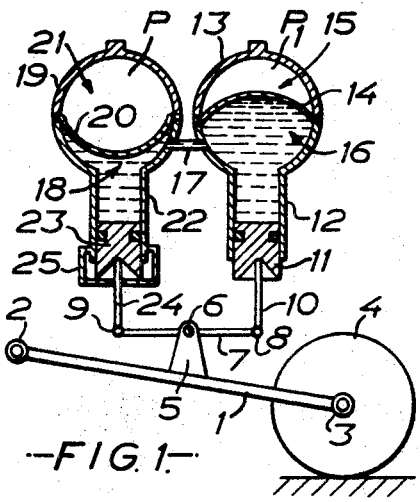
—FIG. 1.—
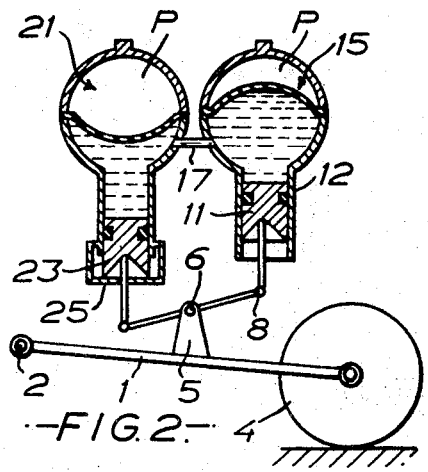
—FIG. 2.—
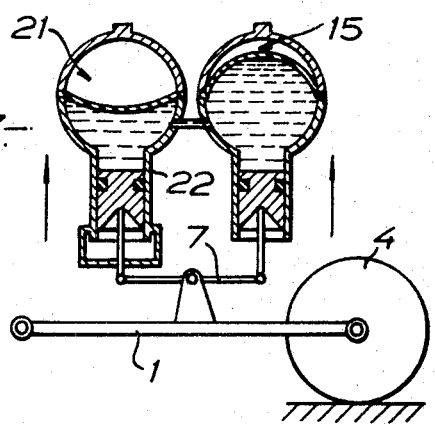
—FIG. 3.—
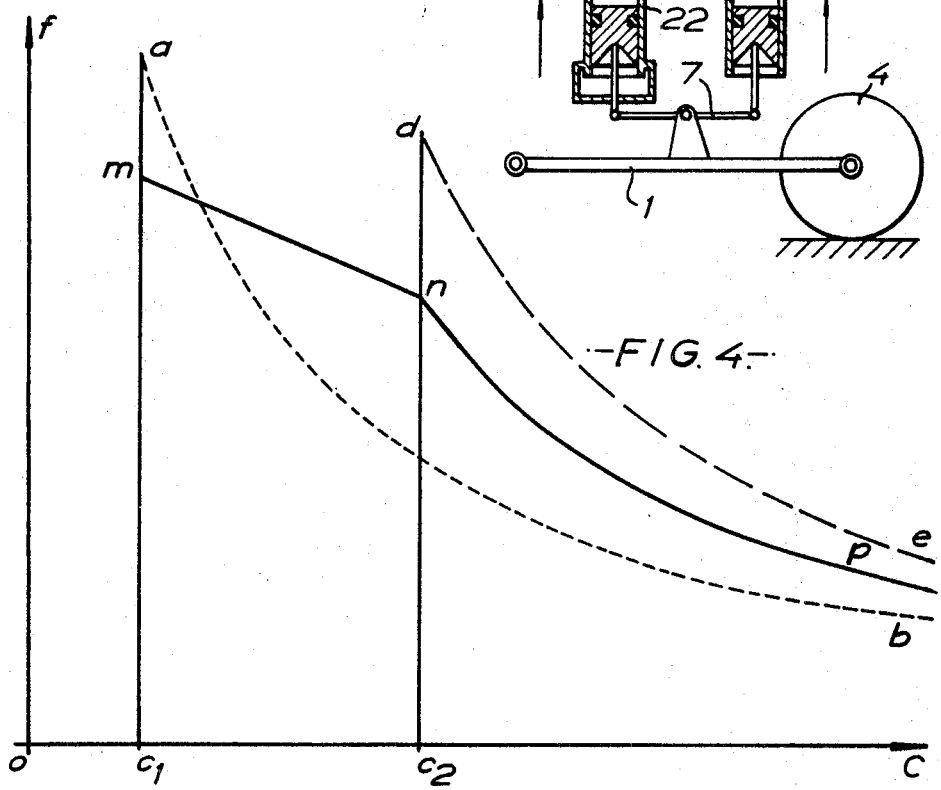
—FIG. 4.—
INVENTOR:
René C. Capgras
BY Karl G. Ross
   Attorney

United States Patent Office 3,536,311
Patented Oct. 27, 1970

3,536,311
HYDROPNEUMATIC SUSPENSION
René Capgras, Paris, France, assignor to Industrial Development Company Establishments, Vaduz, Liechtenstein
Filed Mar. 27, 1968, Ser. No. 716,509
Claims priority, application France, Mar. 29, 1967, 48,467
Int. Cl. B60g 11/30
U.S. Cl. 267—64      3 Claims

ABSTRACT OF THE DISCLOSURE

In a hydropneumatic suspension for the road wheel of a vehicle, the wheel is carried by a pivoted arm on which there is a fulcrum for a two armed lever, at each end of which there is a lifter rod attached to a piston. The two pistons work in separate hydropenumatic cylinders but on the topsides of the pistons there is a communicating passage.

Under light load one of the pistons is stationary and the lever pivots on it, but under heavy loads both pistons are lifted.

---

The present invention relates to improvements in hydropneumatic suspensions of the type used particularly on road vehicles.

Suspension devices of known type have a variable flexibility which diminishes when the load on the vehicle increases. However, if it is desired to equip lorries or like utility vehicles, the total rolling weight of which varies considerably according to whether the vehicle is empty or loaded, it is necessary to provide relatively large gas cushions; if, therefore, only one suspension cylinder is used on each wheel, as is the case with known devices, it is necessary to use a cylinder of very large diameter which cannot be located between the wheels and the chassis of a lorry or truck.

The main object of the invention is to avoid these disadvantages by constructing a hydropneumatic suspension device which is particularly well suited for utility vehicles, both on account of its compactness and for the small decrease in flexibility when the transported load is increased.

A device according to the present invention comprises a swinging suspension arm which actuates a piston sliding in a vertical cylinder for forcing oil into an initial reservoir whose top is occupied by a pressurized gas cushion, the oil chamber of this first reservoir communicating with that of a second reservoir on the top of which there is disposed a gas cushion whose pressure is greater than that of the first cushion when the vehicle is empty, with a second piston sliding in a cylinder of the second reservoir; the shafts or push rods of the two pistons are linked to the ends of a swing bar, whose middle part is in turn linked to the swinging suspension arm.

The ratio of the two arms of the swing bar and the diameters of the pistons are selected according to the desired characteristics of the suspension.

When the load of the vehicle is not sufficient to exert on the second piston a thrust which overcomes the opposing effect of the second cushion, the said second piston and the corresponding end of the swing bar constitute a fixed fulcrum so that the suspension of the vehicle is effected only by the first gas cushion. If the load of the vehicle becomes sufficiently heavy to drive the two pistons simultaneously, the suspension is effected by the two gas cushions which confer upon it a flexibility greater than that which would be obtained with a device of known type. However, the use of two cylinders placed side by side enables a considerable reduction of the space occupied by the width of the device, even if it is used on very heavy vehicles; this facilitates mounting the device on lorries.

One construction in accordance with the invention will now be described, by way of example only, with reference to the accompanying drawings in which:

FIG. 1 is a diagram illustrating a suspension device according to the invention, as positioned when the vehicle is empty;

FIG. 2 corresponds to the case of the vehicle under a weak load;

FIG. 3 shows the position of the unit when the vehicle is heavily loaded; and

FIG. 4 is a diagram showing the characteristic curve of flexibility capable of being obtained with a device according to the invention.

The device shown in the drawings comprises a suspension arm 1 which pivots at one of its ends about an axle 2 connected to the chassis of the vehicle. At its other end, the arm 1 carries a journal 3 on which a wheel rotates; the wheel usually has a pneumatic tire. Welded to the arm 1 is a mounting log 5 carrying a pin 6. The latter serves as a mobile fulcrum for the center portion of a rigid link in the form of a swing bar 7, whose ends carry the pivots indicated by 8 and 9 respectively.

The pivot 8 acts on the lower end of a push rod 10 adapted to slide a piston 11 within a vertical cylinder 12. A spherical reservoir 13, with a housing preferably of metal, overlies the cylinder 12. The reservoir 13 is divided by a movable partition, i.e. a diaphragm 14 into an upper chamber or pneumatic compartment 15 and a lower chamber 16 for hydraulic fluid. The upper chamber 15 contains a gas cushion preferably of compressed nitrogen. The pneumatic pressure of the gas cushion when the vehicle is empty is indicated by $P_1$.

The lower chamber 16 is filled with oil, as is the cylinder 12. It communicates by a pipe 17 with the lower chamber 18 of a second spherical reservoir 19 also including a flexible diaphragm 20 above which there is an upper chamber 21. The latter contains a gas cushion formed of nitrogen compressed at a pressure P when the vehicle is empty. According to the invention, the inflating pressures exerting a downward biasing force upon the respective extremities of link 7 are selected so that $$P > P_1$$

The chamber 18 overlies a second cylinder 22 with which it freely communicates. Sliding tightly in the cylinder 22 is a second piston 23 which is connected to the swing bar 7 by a push bar 24 linked to the pivot 9.

Finally, a fixed abutment 25 is provided, attached to the wall of the second cylinder 22, for limiting the stroke of the piston 23 downwardly under the thrust of the gas in the chamber 21 when the vehicle is empty (FIG. 1) or slightly loaded (FIG. 3).

The operation of the device is as follows:

When the vehicle is traveling empty (FIG. 1), the high pressure P of the gas cushion contained in the chamber 21 keeps the piston 23 in contact with the abutment 25. This piston consequently behaves as a fixed point, immobilizing the pivot 9. Suspension of the wheel 4 is effected solely by the single gas cushion in the chamber 15 which acts on the arm 1 by means of the swing bar 7 pivoting about the fixed axis 9.

If the load of the vehicle is slightly increased (FIG. 2) the axis 9 continues to behave as a fixed point, whilst the piston 23 remains in contact with rod 24. On the other hand, the appreciable rise of the piston 11 in the first cylinder 12 causes an increase in pressure in the gas cushion in the chamber 15. This pressure increases until a threshold value is achieved which may be just equal to P if the pistons 11 and 23 have the same diameter and if the linking axis 6 is located exactly in the centre of the swing bar 7 as shown in FIG. 2.

If the load of the vehicle is again increased, the piston 23 rises in the cylinder 22, whilst the pressure increases simultaneously in the gas cushions of chambers 15 and 21. The suspension of the wheel 4 is then effected jointly by the two resilient biasing means 11–16 and 18–23.

A diagram is shown in FIG. 4 illustrating the operation of the suspension device according to the invention. In this diagram the ordinates show the deflection $f$ of the suspension, that is to say the clearance of the chassis of the vehicle from the ground, whilst the values of the load C of the same vehicle are shown as abscissae.

With only the inflating pressure $P_1$ of the first reservoir 13 taken into account, the operating characteristic obtained with this single sphere would be a hyperbolic arc $ab$. The suspension would begin to act at a load $c_1$.

If however a second reservoir 19 is used inflated to the pressure P, the flexibility curve obtained is a hyperbolic arc $de$ and the suspension would begin to act for a minimum load $c_2$.

Owing to the presence of the swing bar 7, and the intervention of the second reservoir 19 above a certain load (which is assumed to be equal to $c_2$ for the sake of explanation), it will be seen that the resultant curve obtained by the device according to the invention is formed by a first portion $mn$ and by a second portion $np$. The portion $mn$ corresponds to the phases shown in FIGS. 1 and 2 in which only the gas cushion in the chamber 15 is used. The flexibility observed on this portion is then equal to half that which the gas cushion in the chamber would supply alone, and this is due to the mechanical advantage introduced by the swing bar 7 if it is assumed that its two lever arms are equal. The portion $np$ is concerned with the range of heavy loads (FIG. 3) and has a curvature whose ordinates are intermediate between the arcs $ab$ and $de$. For example, if the two lever arms of the swing bar 7 are equal, as are the diameters of the pistons 11 and 23, the ordinates of the portion $np$ are equal to the arithmetical means of those of the arcs $ab$ and $de$.

It should, however, be understood that the above description is given only by way of example and that it in no way limits the scope of the invention which still applies if the details of construction described are replaced by any other equivalent details. In particular, any number of cylinders such as 12 and 22 communicating with each other may be juxtaposed, each associated with a reservoir such as 13 or 19 containing a gas cushion the inflating pressures of the different cushions (when traveling empty), being arranged in series so as to permit their successive entry into operation, the respective pistons being linked with wheel-supporting arm 1 by a system of several articulated swing bars.

What is claimed is:

1. A vehicular suspension system comprising:
    a swingable arm having a free end with a journal for a vehicle wheel and an opposite end pivoted on a fixed axis;
    mounting means forming a mobile fulcrum on an intermediate portion of said arm;
    a rigid link pivotally mounted on said mobile fulcrum;
    first resilient means bearing downwardly upon an extremity of said link on one side of said fulcrum;
    second resilient means bearing downwardly upon another extremity of said link on the opposite side of said fulcrum, said second resilient means having a biasing force substantially exceeding that of said first resilient means for resisting an upward swinging of said arm;
    and abutment means coacting with said second resilient means for limiting the downward displacement of said other extremity whereby the latter at relatively light loads constitutes a fixed fulcrum for the upward pivoting of said link against the force of said first resilient means, said second resilient means yielding to relatively heavy loads with absorption of part of the upward force acting upon said arm.

2. A suspension system as defined in claim 1 wherein each of said resilient means comprises housing means forming a cylinder with a piston having a projecting extension joined to said link at a respective extremity thereof, a movable partition dividing the interior of said housing means into a hydraulic chamber and an overlying pneumatic compartment, and a gas cushion under pressure in said pneumatic compartment, said gas cushion exerting upon said piston a pressure constituting the respective biasing force.

3. A suspension system as defined in claim 2 wherein the cylinders of said first and second resilient means are provided with a passage interconnecting the hydraulic chambers thereof.

References Cited

UNITED STATES PATENTS 2,978,254   4/1961   Bundorf _____ 267—64

JAMES B. MARBERT, Primary Examiner